(12) United States Patent
Kim et al.

(10) Patent No.: US 10,296,008 B2
(45) Date of Patent: May 21, 2019

(54) VEHICLE AND METHOD OF CONTROLLING THE VEHICLE BASED ON A HEIGHT OF CARGO

(71) Applicant: Hyundai Motor Company, Seoul (KR)

(72) Inventors: Sung Un Kim, Gyeonggi-do (KR); Yunha Lee, Seoul (KR); Hyun Jong You, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 4 days.

(21) Appl. No.: 15/157,740

(22) Filed: May 18, 2016

(65) Prior Publication Data

US 2017/0168497 A1    Jun. 15, 2017

(30) Foreign Application Priority Data

Dec. 14, 2015    (KR) .................. 10-2015-0177983

(51) Int. Cl.
| | |
|---|---|
| *G06F 11/30* | (2006.01) |
| *G05D 1/02* | (2006.01) |
| *B60K 37/02* | (2006.01) |
| *B60K 37/06* | (2006.01) |
| *B60K 35/00* | (2006.01) |

(52) U.S. Cl.
CPC ........... *G05D 1/0246* (2013.01); *B60K 35/00* (2013.01); *B60K 37/02* (2013.01); *B60K 37/06* (2013.01); *B60K 2350/106* (2013.01); *B60K 2350/2013* (2013.01); *B60K 2350/924* (2013.01)

(58) Field of Classification Search
CPC ....... B60K 35/00; B60K 37/02; G05D 1/0246
See application file for complete search history.

(56) References Cited

U.S. PATENT DOCUMENTS

| | | | | |
|---|---|---|---|---|
| 2013/0110346 | A1* | 5/2013 | Huber | ............... B60T 7/22 701/33.9 |
| 2013/0222592 | A1* | 8/2013 | Gieseke | ............... G08G 1/04 348/148 |
| 2015/0120178 | A1* | 4/2015 | Kleve | ............... G01C 21/34 701/408 |
| 2015/0364041 | A1* | 12/2015 | Mohtashami | .... G08G 1/096783 702/166 |

(Continued)

FOREIGN PATENT DOCUMENTS

| | | |
|---|---|---|
| JP | 2001-239883 A | 9/2001 |
| JP | 2007-233908 A | 9/2007 |
| JP | 2011-060113 A | 9/2007 |

(Continued)

*Primary Examiner* — Jess Whittington
(74) *Attorney, Agent, or Firm* — Mintz Levin Cohn Ferris Glovsky and Popeo, P.C.; Peter F. Corless

(57) ABSTRACT

A vehicle and a method for controlling the vehicle are provided. In particular, the vehicle includes an imaging device that is configured to acquire an image of a cargo loaded onto the vehicle and a display unit that is configured to display the image of the cargo acquired by the imaging device. Additionally, a processor is then configured to calculate a height of the cargo when the cargo displayed on the display unit is selected, and calculate a total height that is a sum of the height of the cargo and a height of the vehicle. Accordingly, the processor determines whether the vehicle is capable of safely passing through a detected height limit facility without the risk of a potential collision with the cargo.

12 Claims, 8 Drawing Sheets

(56) References Cited

U.S. PATENT DOCUMENTS

2016/0297360 A1* 10/2016 Smyth .................... B60Q 9/00

FOREIGN PATENT DOCUMENTS

| JP | 4687506 B2 | 5/2011 |
|----|------------|--------|
| KR | 2002-0034368 | 5/2002 |
| KR | 10-0444449 | 6/2003 |
| KR | 10-2004-0066528 | 7/2004 |
| KR | 10-2007-0030259 A | 3/2007 |

* cited by examiner

VEHICLE AND METHOD OF CONTROLLING THE VEHICLE BASED ON A HEIGHT OF CARGO

CROSS-REFERENCE TO RELATED APPLICATION

This application claims the benefit of Korean Patent Application No. 10-2015-0177983, filed on Dec. 14, 2015 in the Korean Intellectual Property Office, the disclosure of which is incorporated herein by reference.

BACKGROUND

1. Field of Invention

The present disclosure relates to a vehicle, and more particularly, to a vehicle and a method of controlling the vehicle.

2. Description of the Related Art

Generally, a vehicle is capable of carrying various cargos. For example, cargos of large sizes, such as camping equipment or a bicycle, are loaded into a vehicle. However, when a cargo of a substantial size such as a bicycle is loaded on the roof of a vehicle, the cargo may collide with a height limit facility such as a tunnel, when the vehicle enters the height limit facility.

SUMMARY

An aspect of the present disclosure provides a vehicle which may calculate a total height that is a sum of the height of a cargo and the height of the vehicle, and output a warning message for a driver when the total height is greater than or equal to the height of a height limit facility, and a method of controlling the vehicle. Additional aspects of the disclosure will be set forth in part in the description which follows and, in part, will be obvious from the description, or may be learned by practice of the disclosure.

In accordance with one aspect of the present disclosure, a vehicle may include: an imaging device (e.g., a camera, video camera or the like) configured to acquire an image of a cargo mounted or attached to the vehicle; a display unit configured to display the image of the cargo; and a processor configured to calculate a height of the cargo when the cargo displayed on the display unit is selected and calculate a total height that is a sum of the height of the cargo and a height of the vehicle.

When a height limit facility is sensed, the processor may be configured to output a warning message regarding the risk of a collision through the display unit when the total height is greater than a height of the height limit facility. When the vehicle continues to travel toward the height limit facility even after the warning message is output, the processor may be configured to decelerate and stop the vehicle. When a height limit facility is sensed, the processor may further be configured to output a message informing a driver that the vehicle is able to pass through the height limit facility through the display unit when the total height is less than a height of the height limit facility.

The vehicle may further include an input unit configured to receive a user input regarding a height of the cargo. When the height of the cargo is input through the input unit, the processor may be configured to calculate the total height that is the sum of the height of the cargo and the height of the vehicle. The vehicle may further include a distance sensor configured to sense a height of a height limit facility. The processor may also be configured to calculate the height of the height limit facility based on information sensed by the distance sensor or an image acquired by the imaging device.

In accordance with another aspect of the present disclosure, a vehicle may include: an input unit configured to receive a user input regarding a height of a cargo; an imaging device configured to acquire an image of the cargo; a display unit configured to display the image of the cargo; and a processor configured to calculate a height of the cargo when the cargo displayed on the display unit is selected, to calculate a total height that is a sum of the calculated height of the cargo or the height of the cargo input through the input unit and a height of the vehicle, and to output a warning message regarding the risk of collision through the display unit when the total height is greater than a height of the height limit facility.

In accordance with another aspect of the present disclosure, a method of controlling a vehicle may include: acquiring a height of a cargo; calculating a total height that is a sum of the height of the cargo and a height of the vehicle; and when a height limit facility is sensed, outputting a warning message regarding the risk of collision when the total height is greater than a height of the height limit facility.

The acquiring of the height of the cargo may include: acquiring an image of the cargo using an imaging device of the vehicle; displaying the image of the cargo on a display unit; and calculating the height of the cargo when the cargo displayed on the display unit is selected. The acquiring of the height of the cargo may further include receiving a height of the cargo through an input unit of the vehicle.

The method may further include stopping the vehicle when the vehicle continues to travel toward the height limit facility even after the warning message is output. The method may further include, when a height limit facility is sensed, outputting a message informing a driver that the vehicle is able to pass through the height limit facility when the total height is less than the height of the height limit facility. Additionally, the method may include calculating the height of the height limit facility based on information sensed by a distance sensor of the vehicle or an image acquired by the imaging device.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of a vehicle and a method of controlling the vehicle, according to an aspect of the present disclosure, will be described in detail with reference to the accompanying drawings.

Figure 1:
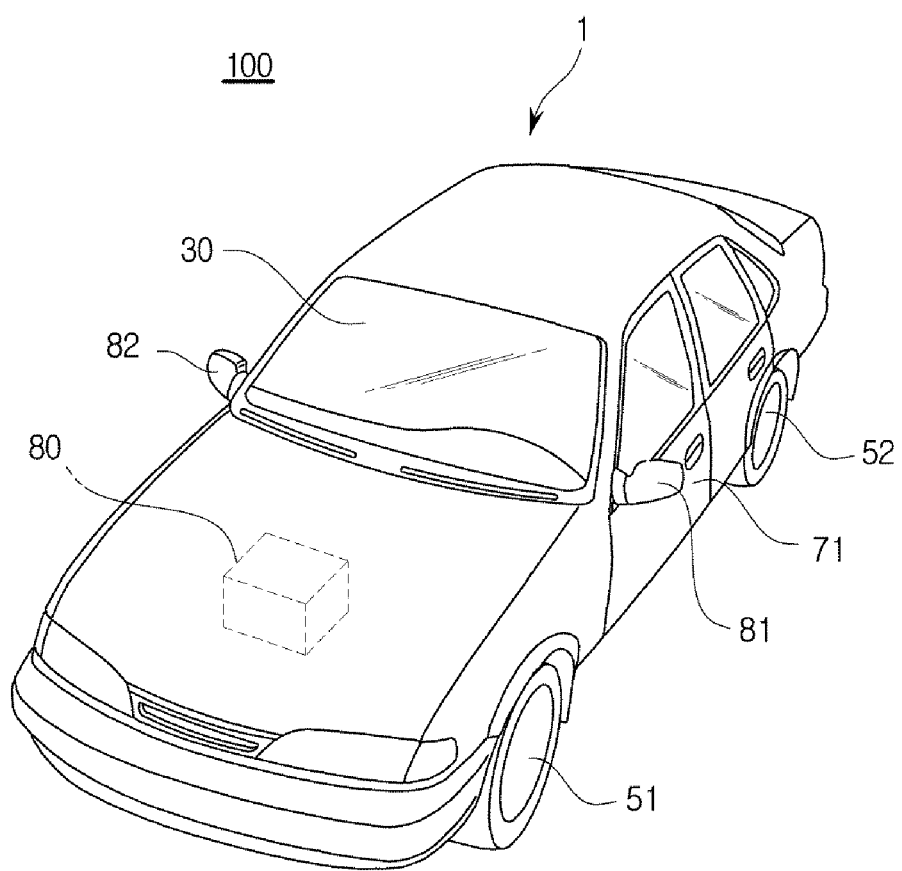
FIG. 1 shows an outer appearance of a vehicle according to an exemplary embodiment of the present disclosure.
Figure 2:
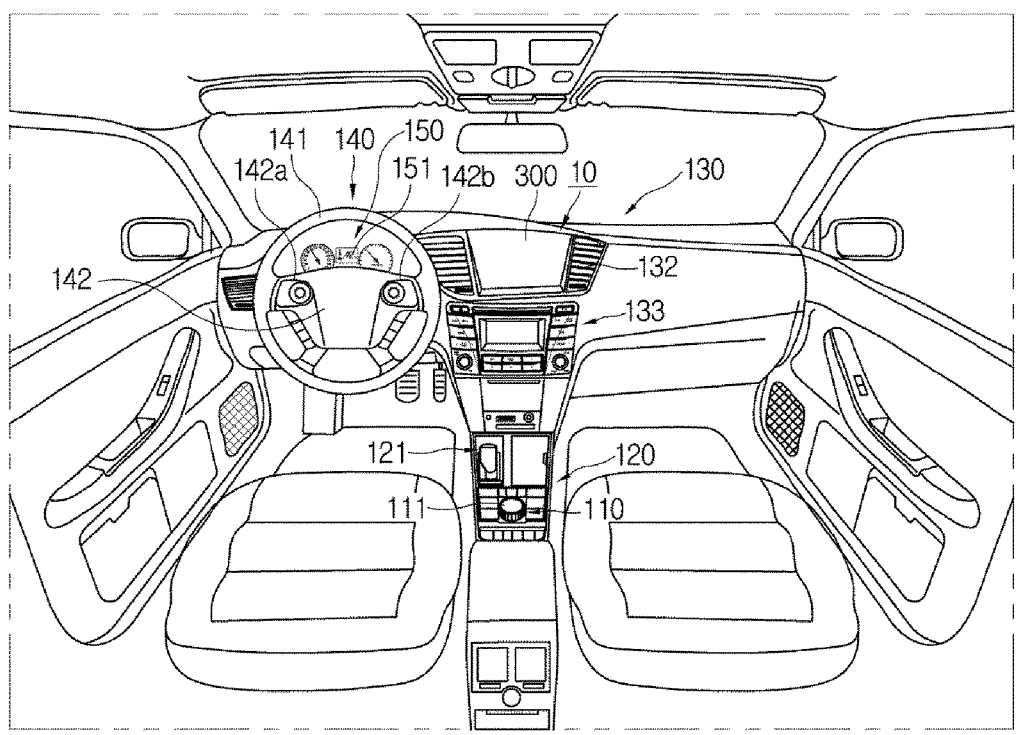
FIG. 2 shows an interior of a vehicle according to an exemplary embodiment of the present disclosure.

FIG. 1 shows an outer appearance of a vehicle according to an exemplary embodiment of the present disclosure, and FIG. 2 shows an interior of the vehicle according to an exemplary embodiment of the present disclosure.

Referring to FIG. 1, a vehicle 100 according to an exemplary embodiment of the present disclosure may include a main body 1 that forms an outer appearance of the vehicle 100, a plurality of wheels 51 and 52 configured to move the vehicle 100, a driving apparatus 80 configured to rotate the wheels 51 and 52, a door 71 configured to shield the interior of the vehicle 100 from the outside, a front glass 30 to provide a driver inside the vehicle 100 with a front view of the vehicle 100, and a plurality of side-view mirrors 81 and 82 to provide the driver with rear views of the vehicle 10.

The wheels 51 and 52 may include front wheels 51 disposed at the front of the vehicle 10, and rear wheels 52 disposed at the rear of the vehicle 10. The driving apparatus 80 may be configured to provide rotatory power to the front wheels 51 or the rear wheels 52 to move the main body 1 forward or backward. The driving apparatus 60 may include an engine configured to burn fossil fuel to produce rotatory power, or a motor configured to receive power from a condenser (not shown) to produce rotatory power.

The door 71 may be rotatably disposed to the left and right of the main body 1 to allow the driver to open the door and enter the vehicle 100. Additionally, the door 71 may shield the interior of the vehicle 100 from the outside when closed. The front glass 30 may be disposed in the upper, front of the main body 1 to allow the driver inside the vehicle 100 to acquire a front view of the vehicle 100. The front glass 30 may also be known as a windshield glass. Further, the side-view mirrors 81 and 82 may include a left side-view mirror 81 disposed to the left of the main body 1 and a right side-view mirror 82 disposed to the right of the main body 1 to allow the driver inside the vehicle 100 to monitor side and rear situations of the vehicle 100.

In addition, the vehicle 100 may include various sensors configured to sense an obstacle around (e.g., within the vicinity of) the vehicle 100 to allow the driver to recognize the surroundings of the vehicle 100. The vehicle 100 may further include various sensors configured to sense driving information of the vehicle 100 such as the speed of the vehicle 100. The vehicle may also include a sensor or imaging device configured to acquire images of the surroundings of the vehicle 100, such as road lanes. The various sensors used to sense driving information of the vehicle 100 or situations around the vehicle 100 will be described later.

As shown in FIG. 2, the vehicle 100 may include a dashboard on which a gear box 120, a center fascia 130, a steering wheel 140, and an instrument panel 150 may be installed. The gear box 120 may include a gear lever 121 for shifting gears. As shown in FIG. 2, the gear box 120 may include an input unit 110 including various buttons and a dial controller 111 to allow a user to control functions of a multimedia system, such as a navigation system 10 or an audio system 133, or to operate main functions of the vehicle 100. On the center fascia 130, an air conditioner 132, the audio system 133, and the navigation system 10 may be installed.

Furthermore, the air conditioner 132 may be configured to adjust the temperature, humidity, air quality, and flow of air within the vehicle 100. The air conditioner 132 may be installed in the center fascia 130, and may include at least one vent for discharging air. In the center fascia 130, at least one button or dial for operating the air conditioner 132, etc. may be provided. A user may use the buttons or dial disposed on the center fascia 130 to operate the air conditioner 132 of the vehicle 100. The user may also operate the air conditioner 132 using the buttons of the input unit 120 or the dial controller 111 installed in the gear box 120.

According to an exemplary embodiment, the navigation system 10 may be mounted on the center fascia 130. The navigation system 10 may be embedded into the center fascia 130 of the vehicle 100. According to an exemplary embodiment, the center fascia 130 may include an input unit for operating the navigation system 10. The input unit of the navigation system 10 may be installed at another location, other than the center fascia 130. For example, the input unit of the navigation system 10 may be installed around a display unit 300. According to another example, the input unit of the navigation system 10 may be installed at the gear box 120, but the disclosure is not limited thereto.

The steering wheel 140 may be used to change the traveling direction of the vehicle 100. The steering wheel 140 may include a rim 141 gripped by the driver, and a spoke 142 that connects to a steering apparatus of the vehicle 100 and connects the rim 31 to a hub of a rotation axis for steering. According to an exemplary embodiment, the spoke 142 may include a plurality of manipulation units 142a and 142b for operating various devices (for example, an audio system) of the vehicle 100. Additionally, the dashboard may further include various types of instrument panels 150 to display speed, revolutions per minute (RPM), and fuel gauge of the vehicle 100. The instrument panels 150 may include instrument panel display units 151 configured to display states of the vehicle 100, driving-related information, and information related to manipulations of the multimedia system.

The vehicle 100 may be driven by manipulation of the above-described devices installed on the dashboard. The vehicle 100 may further include various types of sensors configured to detect, measure, and sense information regarding the surroundings of the vehicle 100 or driving information of the vehicle 100 required for driving of the vehicle 100, other than the user manipulated devices to drive the vehicle 100, as shown in FIG. 2.

Meanwhile, when a cargo (e.g., bicycle) mounted, attached, or loaded to the vehicle has a substantially high height, a total height that is a sum of the height of the vehicle and the height of the bicycle may cause a potential collision with the wall of a tunnel or other height limit facility when the vehicle enters the height limit facility. The height limit facility may include any structure that the vehicle may travel through or under (e.g., tunnel, bridge, or the like). Accordingly, the vehicle of the present disclosure may include a processor configured to calculate a height of a cargo to prevent collision with a height limit facility when the vehicle enters the height limit facility, and a method of controlling the vehicle. Hereinafter, the exemplary embodiments of the present disclosure will be described in detail.

Figure 3:
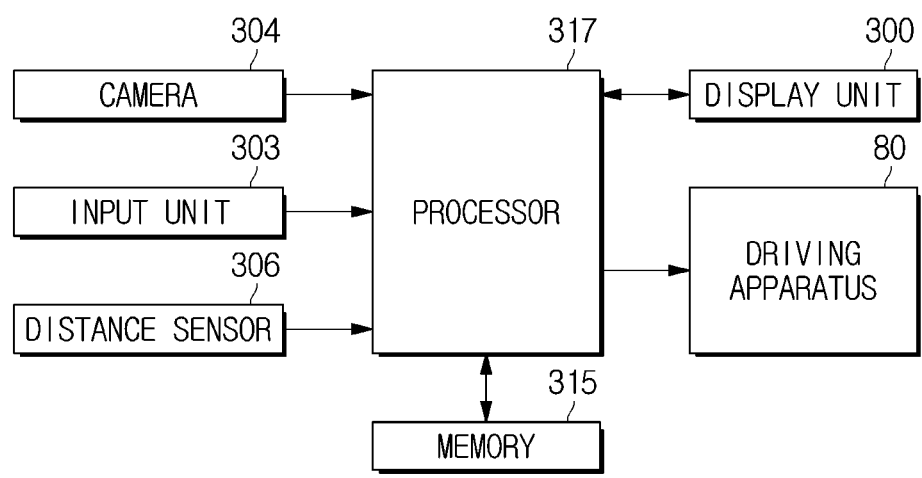
FIG. 3 is a control block diagram of a vehicle according to an exemplary embodiment of the present disclosure.
Figure 4:
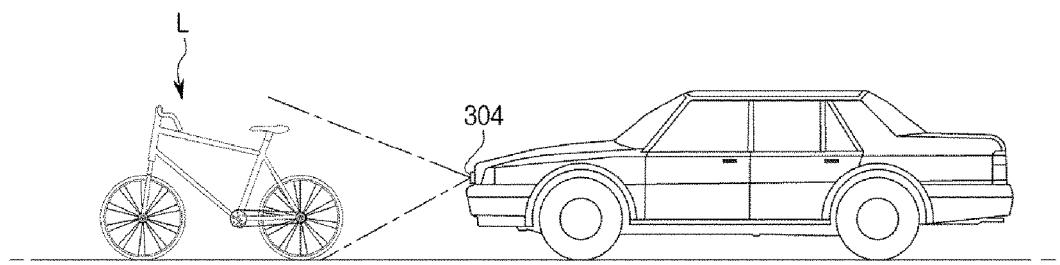
FIG. 4 is a view for describing a method in which an imaging device of a vehicle according to an exemplary embodiment of the present disclosure acquires an image of a cargo.
Figure 5:
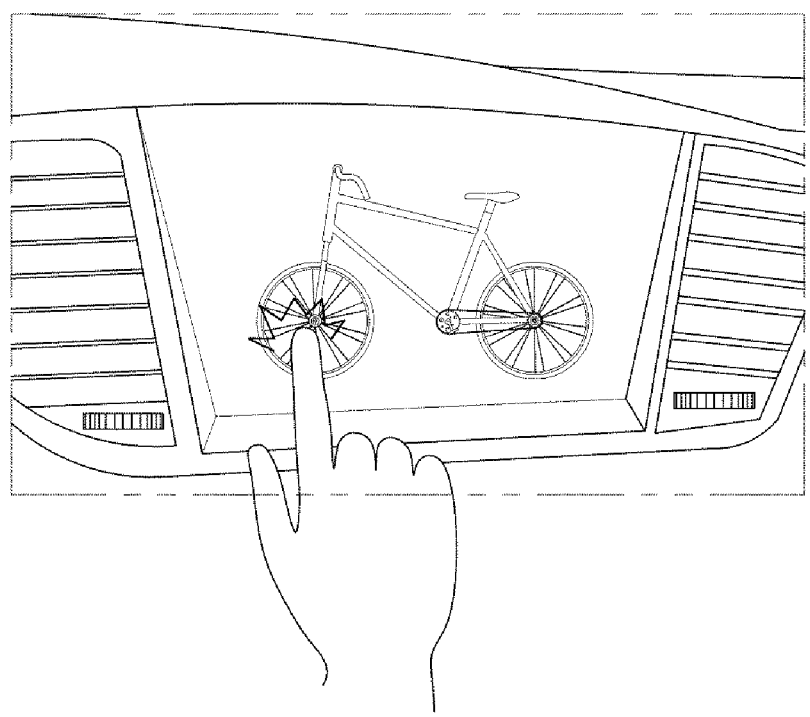
FIG. 5 shows a screen of a display unit that displays the image of the cargo acquired by the imaging device of FIG. 4 according to an exemplary embodiment of the present disclosure.
Figure 6:
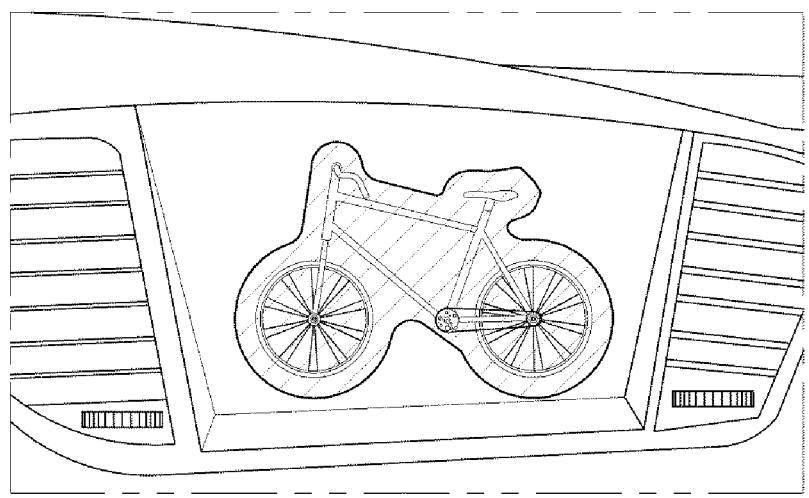
FIG. 6 shows a screen of the display unit when the cargo is selected in the displayed image according to an exemplary embodiment of the present disclosure.
Figure 7:
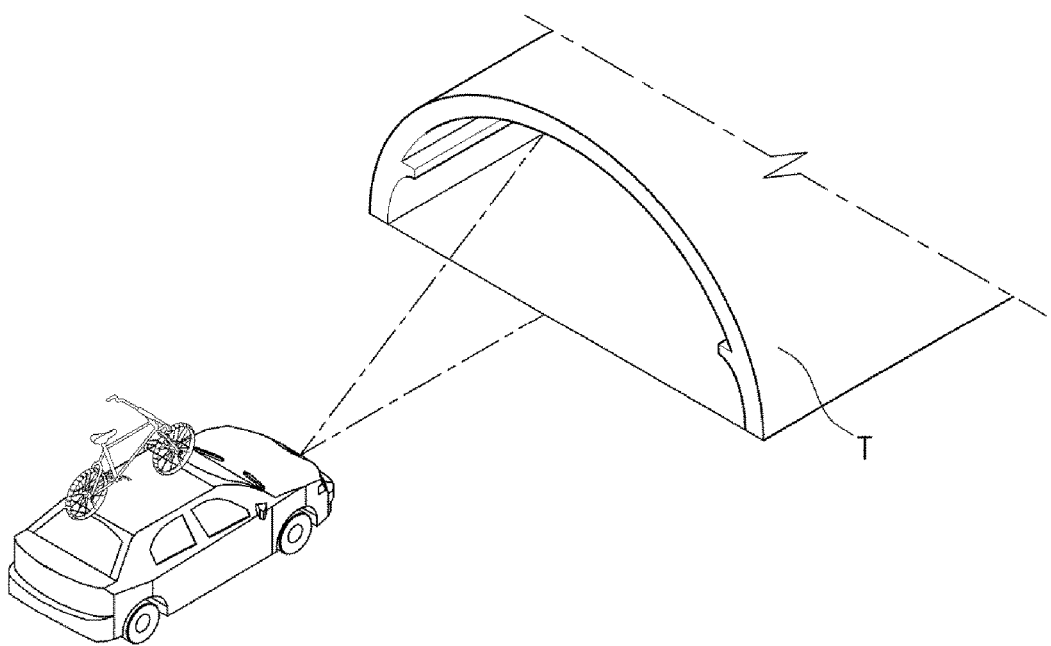
FIG. 7 shows a case in which a vehicle according to an exemplary embodiment of the present disclosure senses a tunnel during traveling.

FIG. 3 is a control block diagram of the vehicle according to an exemplary embodiment of the present disclosure, FIG. 4 is a view for describing a method in which an imaging device (e.g., camera, video camera, or the like) of the vehicle according to an exemplary embodiment of the present disclosure acquires an image of a cargo, FIG. 5 shows a screen of a display unit that displays the image of the cargo acquired by the imaging device of FIG. 4, FIG. 6 shows a screen of the display unit when the cargo is selected in the displayed image, and FIG. 7 shows a case in which the vehicle according to an exemplary embodiment of the present disclosure senses a tunnel during traveling.

Referring to FIG. 3, a vehicle according to an exemplary embodiment of the present disclosure may include an imaging device 304 configured to acquire an image of a cargo, an input unit 303 configured to receive a user input regarding a height of the cargo, a distance sensor 306 configured to sense or detect a height limit facility such as a tunnel, a processor 317 (e.g., part of a controller having a processor and a memory) configured to calculate a total height which is a sum of the height of the vehicle and the height of a cargo calculated from an image acquired by the imaging device 304 or according to a user input through the input unit 303, a memory 315 configured to store information regarding the height of the vehicle and the total height calculated by the processor 317, a display unit 300 configured to display the image acquired by the imaging device 304, and a driving apparatus 80 configured to adjust traveling of the vehicle under the control of the processor 317. The processor 317 may be configured to operate the various components on the system.

The imaging device 304 may be configured to acquire an image of surroundings of the vehicle (e.g., the environment in the vicinity of the vehicle and in surrounding directions of the vehicle), particularly, an image of a cargo loaded or mounted onto the vehicle (e.g., cargo mounted on roof of vehicle but the location is not limited thereto), and transmit the image to the processor 317. The imaging device 304 may include a front imaging device configured to acquire images of a front view of the vehicle, and may further include at least one of a left imaging device configured to acquire images of a left view of the vehicle, a right imaging device configured to acquire images of a right view of the vehicle, and a rear imaging device configured to acquire images of a rear view of the vehicle. The imaging devices may further be configured to capture an image of a cargo mounted to the roof of the vehicle. The imaging device may include a charge coupled devices (CCD) sensor or a complementary metal oxide semiconductors (CMOS) sensor.

As shown in FIG. 4, the imaging device 304 may be configured to acquire an image of a cargo, and the image of the cargo may be displayed on the display unit 300, as shown in FIG. 5. In FIG. 4, an image of a cargo is acquired by a front imaging device, however, the image of the cargo may be acquired by another imaging device such as the rear imaging device. To acquire an image required for calculating the height of a cargo, the cargo may be positioned within an angle of view of the imaging device 304. The imaging device 304 used to measure the height of a cargo may be a stereo imaging device or a three-dimensional (3D) imaging device.

The vehicle according to an exemplary embodiment of the present disclosure may include a cargo height measuring mode used to measure the height of a cargo. In particular, the cargo height measuring mode may be selected through the input unit 303 provided within the vehicle. When the cargo height measuring mode is selected, a user may select an imaging device 304 to be used to measure the height of a cargo when the vehicle includes a plurality of imaging devices 304, and then may locate the cargo within an angle of view of the selected imaging device 304. However, the present disclosure is not limited thereto an imaging device may be automatically selected based on detecting in which imaging device the cargo is sensed.

Further, when an image of the cargo is acquired by the imaging device 304, the acquired image may be displayed on the display unit 300 of the vehicle, as shown in FIG. 5. Herein, the display unit 300 may be the display unit of the navigation system 10, as shown in FIG. 5. Alternatively, the image of the cargo may be displayed on an instrument panel display unit.

When the image of the cargo is displayed on the display unit 300, the user may select the cargo to measure the height thereof, in the image displayed on the display unit 300. For example, the user may touch the cargo in the image to select the cargo (e.g., the display unit may be a touch screen), as shown in FIG. 5, or may manipulate the input unit 303 provided within the vehicle to select the cargo. When the cargo is selected, the display unit 300 may enhance the selected cargo rather than other objects displayed in the image to allow the user to recognize that the cargo whose height is to be measured has been selected, as shown in FIG. 6. For example, the selected cargo may be displayed with an adjusted brightness, may be displayed in another color, may be displayed in a blinking manner, or any other manner in which the user is able to distinguish the selected cargo from other objects within the image.

In FIG. 6, a case of enhancing the selected cargo with solid lines is shown, however, the selected cargo may be enhanced through other various methods as discussed above. Further, the processor 317 may be configured to calculate the height of the selected cargo, and display the height of the cargo on the display unit 300 to allow the user to recognize the height of the cargo. For example, the display unit 300 may be configured to display a message representing the height of the cargo, or output the height of the cargo in the form of voice. Additionally, after the display unit 300 displays a message representing the height of the cargo, the display unit 300 may be configured to display a message requesting the user confirmation. To confirm the height of the cargo, the user may touch the display unit 300 or may use the input unit 303.

Information regarding the height of the cargo confirmed by the user may be stored in the memory 315. Accordingly, the stored information may be used when the same cargo is loaded on the vehicle. Additionally, the memory 315 may include stored information regarding the height of the vehicle in advance. When the height of the cargo is calculated, the processor 317 may be configured to add the height of the cargo to the height of the vehicle stored in advance in the memory 315 to calculate a total height of the vehicle and the cargo. Information regarding the total height may be also stored in the memory 315.

Meanwhile, the vehicle according to the exemplary embodiment of the present disclosure may include a cargo height measuring mode to prevent potential collision of a cargo with a height limit facility. When a vehicle is driven with a cargo loaded thereto, the cargo height measuring mode may be initiated by a driver to prevent potential collision with height limit facilities. When the cargo height measuring mode for preventing collision of a cargo with a height limit facility is initiated after the cargo is loaded on the roof of the vehicle, the vehicle may monitor appearance of a height limit facility while the vehicle is being driven.

Particularly, the vehicle may be configured to sense a height limit facility such as a tunnel using the distance sensor 306 while the vehicle is being driven. The distance sensor 306 may be configured to sense objects extraneous to the vehicle, for example, a preceding vehicle traveling ahead of the vehicle, a fixed object such as a structure installed around a road, another vehicle traveling on the opposing lane, the ground state of a road, a height limit facility such as a tunnel, and the like. The distance sensor 306 of the vehicle according to the current exemplary embodiment may be a radar or a light detection and ranging (lidar).

Furthermore, the imaging device 304 may also be configured to acquire an image of a height limit facility appearing in front of the vehicle while the vehicle is being driven. The processor 317 may be configured to sense a height limit facility such as a tunnel disposed in the advancing (e.g., forward or traveling) direction of the vehicle, as shown in FIG. 7, based on data regarding the height limit facility sensed by the distance sensor 306 or the image of the height limit facility acquired by the imaging device 304, and then may be configured to calculate the height of the sensed height limit facility. For example, when a tunnel is sensed, the processor 317 may be configured to calculate a vehicle passing height of the tunnel (e.g., a height limitation of the tunnel or maximum allowed height).

Additionally, the processor 317 may be configured to use map information stored in the navigation system 10, in addition to data acquired by the imaging device 304 or the distance sensor 306, to acquire information regarding the height of the height limit facility disposed in the advancing direction of the vehicle. When the imaging device 304 acquires an image of a signpost disposed near or proximate to the height limit facility, the processor 317 may be configured to perform image processing on the image of the signpost to extract information regarding the height of the height limit facility written on the signpost. That is, the processor may be configured to determine the height of the height limit facility using information contained on the signpost in the vicinity of the height limit facility.

After the processor 317 calculates the height of the height limit facility, the processor 317 may be configured to compare the height of the height limit facility to the total height of the vehicle and cargo stored in the memory 315. When the processor 317 determines that the total height is less than the height of the height limit facility, the processor 317 may be configured to output a pass message through the display unit 300 to inform the user that the vehicle may safely pass through the height limit facility. The processor 317 may be configured to output a voice message to inform the user that the vehicle may pass through the height limit facility, together with the pass message.

When the processor 317 determines that the total height is greater than the height of the height limit facility, the processor 317 may be configured to output a warning message regarding the risk of potential collision through the display unit 300, to inform the user that the vehicle is not capable of passing through the height limit facility. In particular, the processor 317 may be configured to output a voice message to inform the user that the cargo may collide with the height limit facility, together with the warning message.

Further, the user may view the warning message regarding the risk of collision, and take action to prevent collision with the height limit facility, thereby preventing collision with the height limit facility. However, when the vehicle continues to travel toward the height limit facility even after the warning message regarding the risk of collision is output, the processor 317 may be configured to continue outputting the warning message and the voice message. When a distance between the vehicle and the height limit facility become less than a predetermined distance (e.g., a distance in which the vehicle is capable of being stopped), the processor 317 may be configured to decelerate and stop the vehicle without the user operation of the vehicle brakes, to prevent the cargo of the vehicle from colliding with the height limit facility. By stopping the vehicle urgently, the processor 317 may prevent the cargo from colliding with the height limit facility when the vehicle enters the height limit facility.

Figure 8:
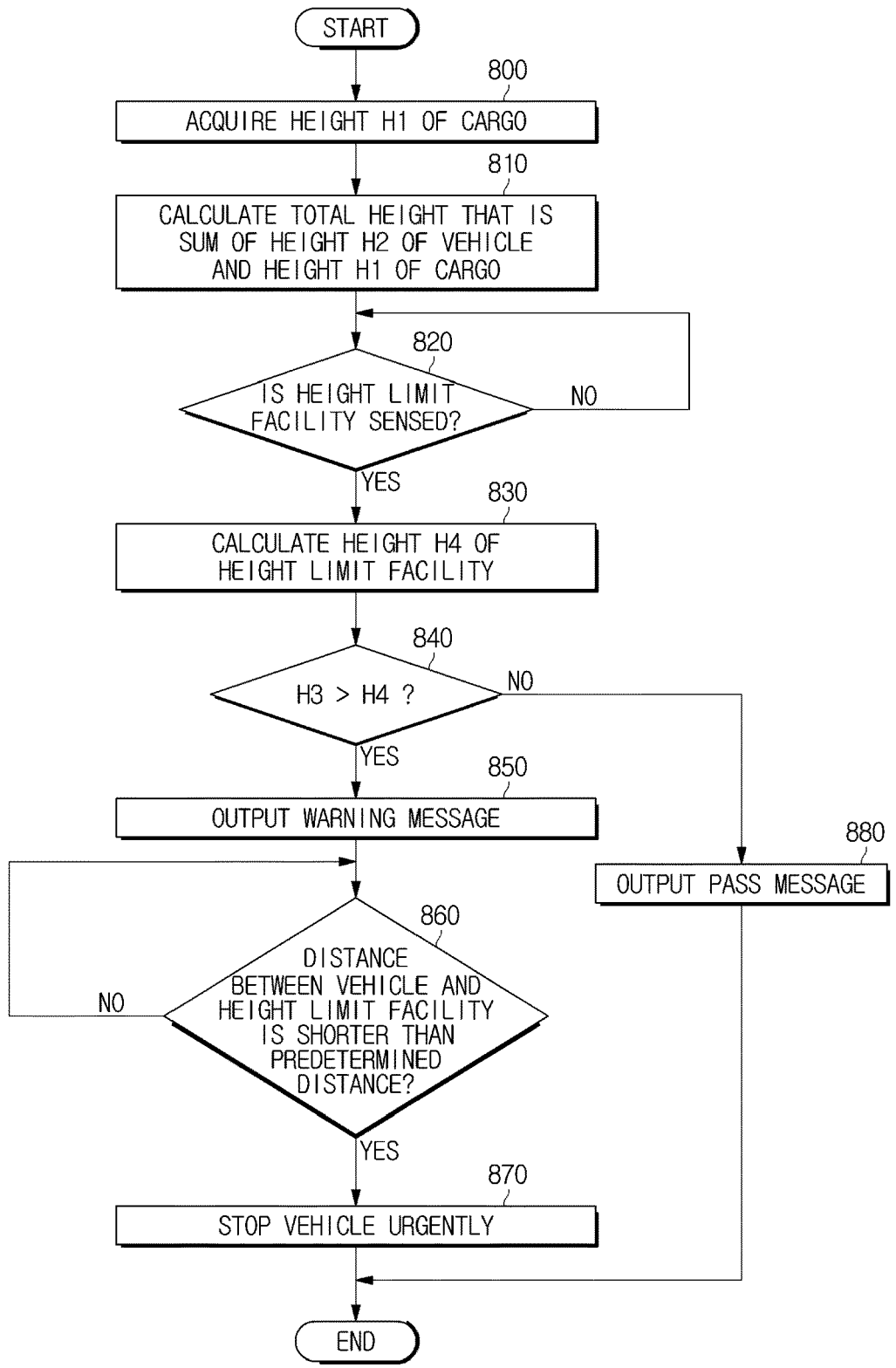
FIG. 8 is a flowchart illustrating a method of controlling a vehicle according to an exemplary embodiment of the present disclosure.

FIG. 8 is a flowchart illustrating a method of controlling the vehicle according to an exemplary embodiment of the present disclosure. Referring to FIG. 8, the processor 317 may be configured to measure a height H1 of a cargo, in operation 800, and calculate a total height H3 that is a sum of the height H1 of the cargo and a height H2 of the vehicle, in operation 810. When an image of the cargo is acquired by the imaging device 304, the acquired image of the cargo may be displayed on the display unit 300 of the vehicle, as shown in FIG. 5. The display unit 300 may be the display unit of the navigation system 10, as shown in FIG. 5. Alternatively, the image of the cargo acquired by the imaging device 304 may be displayed on an instrument panel display unit.

When the image of the cargo is displayed on the display unit 300, the user may select the cargo whose height is to be measured, in the image displayed on the display unit 300. The user may touch the cargo in the image to select the cargo, as shown in FIG. 5, or may manipulate the input unit 303 disposed within the vehicle to select the cargo. When the cargo is selected, the display unit 300 may be configured to enhance the selected cargo, as discussed above, rather than other objects displayed in the image to allow the user to recognize that the cargo whose height is to be measured has been selected, as shown in FIG. 6.

The processor 317 may be configured to calculate the height H1 of the selected cargo, and display the height H1 of the cargo on the display unit 300 to allow the user to recognize the height of the cargo. The display unit 300 may be configured to display a message representing the height H1 of the cargo, or output the height H1 of the cargo in the form of a voice message. Additionally, after the display unit 300 displays a message representing the height H1 of the cargo, the display unit 300 may be configured to display a message requesting user confirmation of the output height information. To confirm the height H1 of the cargo, the user may touch the display unit 300 or use the input unit 303.

Information regarding the height H1 of the cargo confirmed by the user may be stored in the memory 315 and the stored information may be used when the same cargo is loaded on the vehicle. Additionally, information regarding the height H2 of the vehicle may have been previously stored in the memory 315. After the height H1 of the cargo is calculated, the processor 317 may be configured to add the height H1 of the cargo to the height H2 of the vehicle stored in advance in the memory 315 to calculate the total height H3 of the vehicle and the cargo. Information regarding the total height H3 may be also stored in the memory 315.

When the processor 317 senses a height limit facility while the vehicle is being driven in operation 820, the processor 317 may be configured to calculate a height H4 of the height limit facility, in operation 830. Then, the processor 317 may be configured to compare the total height H3 of the vehicle and the cargo to the height H4 of the height limit facility, in operation 840. When the processor 317 determines that the total height H3 of the vehicle and the cargo is less than the height H4 of the height limit facility ("No" in operation 840), the processor 317 may be configured to output a pass message in operation 880, and when the processor 317 determines that the total height H3 of the vehicle and the cargo is greater than the height H4 of the height limit facility ("Yes" in operation 840), the processor 317 may be configured to output a warning message in operation 850. After the warning message is output, the processor 317 may be configured to determine whether a distance between the vehicle and the height limit facility is less than a predetermined distance, in operation 860. When the processor 317 determines that the distance between the vehicle and the height limit facility is less than the predetermined distance ("Yes" in operation 860), the processor 317 may be configured to abruptly decelerate and stop the vehicle, in operation 870.

The vehicle may be configured to sense a height limit facility such as a tunnel using the distance sensor 306 while the vehicle is being driven. In particular, the distance sensor 306 may be configured to sense objects extraneous to the vehicle, for example, a preceding vehicle traveling ahead of the vehicle, a fixed object such as a structure installed around a road, another vehicle traveling on the opposing lane, the ground state of a road, and a height limit facility such as a tunnel. The distance sensor 306 of the vehicle according to the current exemplary embodiment may be a radar or a lidar.

The imaging device 304 may also be configured to acquire an image of a height limit facility appearing in front of the vehicle while the vehicle is being driven. The processor 317 may be configured to sense a height limit facility such as a tunnel disposed in the advancing direction of the vehicle, as shown in FIG. 7, based on data regarding the height limit facility sensed by the distance sensor 306 or the image of the height limit facility acquired by the imaging device 304, and then calculate the height of the sensed height limit facility. For example, when a tunnel is sensed, the processor 317 may be configured to calculate a vehicle passing height of the tunnel.

Additionally, the processor 317 may be configured to use map information stored in the navigation system 10, in addition to data acquired by the imaging device 304 or the distance sensor 306, to acquire information regarding the height of the height limit facility disposed in the advancing direction of the vehicle, as discussed above. When the imaging device 304 acquires an image of a signpost disposed near the height limit facility, the processor 317 may be configured to perform image processing on the image of the signpost to extract information regarding the height of the height limit facility provided by the signpost.

After the processor 317 calculates the height H4 of the height limit facility, the processor 317 may be configured to compare the total height H3 of the vehicle and the cargo stored in the memory 315 to the height H4 of the height limit facility. When the processor 317 determines that the total height H3 is less than the height H4 of the height limit facility, the processor 317 may be configured to output a pass message using the display unit 300 to inform the user that the vehicle may safely pass through the height limit facility. In particular, the processor 317 may be configured to output a voice message informing the user that the vehicle may pass through the height limit facility, together with the pass message.

When the processor 317 determines that the total height H3 is greater than the height H4 of the height limit facility, the processor 317 may be configured to output a warning message regarding the risk of potential collision using the display unit 300, to inform the user that the vehicle is not capable of passing through the height limit facility. In particular, the processor 317 may be configured to output a voice message to inform the user that the cargo may collide with the height limit facility, together with the warning message.

The user may view the warning message regarding the risk of potential collision, and take action to prevent collision with the height limit facility, thereby preventing collision with the height limit facility. When the vehicle continues to travel toward the height limit facility even after the warning message for warning the risk of collision is displayed, the processor 317 may be configured to continue to output the warning message and the voice message.

However, when the processor 317 determines that the distance between the vehicle and the height limit facility is less than the predetermined distance, the processor may be configured to abruptly decelerate and stop the vehicle, without the user operation of the vehicle brakes, to prevent the cargo of the vehicle from colliding with the height limit facility. By stopping the vehicle urgently, the processor 317 may prevent the cargo from colliding with the height limit facility when the vehicle enters the height limit facility.

According to the vehicle and the method of controlling the vehicle, as described above, it may possible to prevent, when the vehicle loads a cargo and passes through a height limit facility such as a tunnel, the cargo from colliding with the wall of the tunnel.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

What is claimed is:

1. A vehicle, comprising:
a camera configured to acquire an image of a cargo to be loaded onto the vehicle before the cargo is loaded onto the vehicle;
a display configured to display the image of the cargo acquired by the camera;
a processor configured to calculate a height of the cargo when a selection of the cargo displayed on the display is received via an input, and to calculate a total height that is a sum of the height of the cargo and a height of the vehicle;
a memory configured to store information regarding the height of the cargo and the height of the vehicle; and
a distance sensor configured to sense information regarding a height of a height limit facility, wherein
the processor is further configured to calculate the height of the height limit facility based on the information sensed by the distance sensor, the image of the cargo acquired by the camera, and map information stored in a navigation system of the vehicle, and to decelerate or stop the vehicle based on the calculated total height, and
the camera includes at least one of a stereo imaging device and a three-dimensional (3D) imaging device.

2. The vehicle according to claim 1, wherein when the height limit facility is sensed, the processor is configured to output a warning message regarding a potential risk of a collision using the display when the total height is greater than the height of the height limit facility detected while the vehicle is driven.

3. The vehicle according to claim 2, wherein, when the vehicle travels toward the height limit facility after the warning message is output, and a distance between the vehicle and the height limit facility is less than a predetermined distance, the processor is configured to decelerate and stop the vehicle.

4. The vehicle according to claim 1, wherein when the height limit facility is sensed, the processor is configured to output a message using the display informing a driver that the vehicle is able to pass through the height limit facility when the total height is less than the height of the height limit facility.

5. The vehicle according to claim 1, wherein the input is configured to receive a user input regarding the height of the cargo.

6. The vehicle according to claim 5, wherein when the height of the cargo is input through the input, the processor is configured to calculate the total height that is the sum of the height of the cargo and the height of the vehicle.

7. The vehicle according to claim 1, wherein the image of the cargo displayed by the display is an image of the cargo before the cargo is loaded onto the vehicle.

8. A vehicle, comprising:
an input;
a camera configured to acquire an image of a cargo to be loaded onto the vehicle before the cargo is loaded onto the vehicle;
a display configured to display the image of the cargo acquired by the camera;
a processor configured to:
calculate a height of the cargo when a selection of the cargo displayed on the display is received via the input;
calculate a total height that is a sum of the calculated height of the cargo and a height of the vehicle or a sum of a height of the cargo received via the input and the height of the vehicle; and
output a warning message regarding a potential risk of a collision using the display when the total height is greater than a height of a height limit facility detected while the vehicle is driven;
a memory configured to store information regarding the height of the cargo and the height of the vehicle; and
a distance sensor configured to sense information regarding the height of the height limit facility, wherein
the processor is further configured to calculate the height of the height limit facility based on the information sensed by the distance sensor, the image of the cargo acquired by the camera, and map information stored in a navigation system of the vehicle, and to decelerate or stop the vehicle based on the calculated total height, and
the camera includes at least one of a stereo imaging device and a three-dimensional (3D) imaging device.

9. A method of controlling a vehicle, comprising:
acquiring, by a camera of the vehicle, an image of a cargo to be loaded onto the vehicle before the cargo is loaded onto the vehicle;
displaying, by a display of the vehicle, the image of the cargo acquired by the camera;
acquiring, by a processor of the vehicle, a height of the cargo when a selection of the cargo displayed on the display is received via an input;
calculating, by the processor, a total height that is a sum of the height of the cargo and a height of the vehicle;
when a height limit facility is sensed, outputting, by the processor, a warning message regarding a potential risk of a collision when the total height is greater than a height of a height limit facility detected while the vehicle is driven;
storing, in a memory, information regarding the height of the cargo and the height of the vehicle;
sensing, by a distance sensor, information regarding the height of the height limit facility;
calculating, by the processor, the height of the height limit facility based on the information sensed by the distance sensor, the image of the cargo acquired by the camera, and map information stored in a navigation system of the vehicle; and
decelerating or stopping, by the processor, the vehicle based on the calculated total height.

10. The method according to claim 9, wherein the acquiring of the height of the cargo includes:
receiving, by the processor, the height of the cargo through the input of the vehicle.

11. The method according to claim 9, further comprising:
decelerating and stopping, by the processor, the vehicle when the vehicle travels toward the height limit facility after the warning message is output and a distance between the vehicle and the height limit facility is less than a predetermined distance.

12. The method according to claim 10, further comprising:
    in response to sensing the height limit facility, outputting, by the processor, a message informing a driver that the vehicle is able to pass through the height limit facility when the total height is less than the height of the height limit facility.

\* \* \* \* \*